US011966849B2

(12) United States Patent
Collomosse et al.

(10) Patent No.: US 11,966,849 B2
(45) Date of Patent: Apr. 23, 2024

(54) IMAGE PROCESSING NETWORK SEARCH FOR DEEP IMAGE PRIORS

(71) Applicant: Adobe Inc., San Jose, CA (US)

(72) Inventors: John Collomosse, Woking (GB); Hailin Jin, San Jose, CA (US)

(73) Assignee: Adobe Inc., San Jose, CA (US)

( * ) Notice: Subject to any disclaimer, the term of this patent is extended or adjusted under 35 U.S.C. 154(b) by 226 days.

(21) Appl. No.: 16/796,878

(22) Filed: Feb. 20, 2020

(65) Prior Publication Data

US 2021/0264282 A1   Aug. 26, 2021

(51) Int. Cl.
*G06N 3/086* (2023.01)
*G06N 3/045* (2023.01)
*G06N 3/048* (2023.01)

(52) U.S. Cl.
CPC ............. *G06N 3/086* (2013.01); *G06N 3/045* (2023.01); *G06N 3/048* (2023.01)

(58) Field of Classification Search
CPC .... G06N 3/086; G06N 3/0454; G06N 3/0481; G06N 3/084; G06N 3/126; G06T 2207/20084; G06T 5/001
See application file for complete search history.

(56) References Cited

U.S. PATENT DOCUMENTS

2019/0080240 A1* 3/2019 Andoni ................. G06N 3/084
2020/0142978 A1* 5/2020 Salokhe ................. G06F 18/24

OTHER PUBLICATIONS

Deep Image Prior, Ulyanov et al, 2018 (Year: 2018).*

* cited by examiner

*Primary Examiner* — Jianxun Yang
(74) *Attorney, Agent, or Firm* — Nicholson De Vos Webster & Elliott LLP

(57) ABSTRACT

Techniques and systems are provided for configuring neural networks to perform certain image manipulation operations. For instance, in response to obtaining an image for manipulation, an image manipulation system determines the fitness scores for a set of neural networks resulting from the processing of a noise map. Based on these fitness scores, the image manipulation system selects a subset of the set of neural networks for cross-breeding into a new generation of neural networks. The image manipulation system evaluates the performance of this new generation of neural networks and continues cross-breeding this neural networks until a fitness threshold is satisfied. From the final generation of neural networks, the image manipulation system selects a neural network that provides a desired output and uses the neural network to generate the manipulated image.

19 Claims, 9 Drawing Sheets

IMAGE PROCESSING NETWORK SEARCH FOR DEEP IMAGE PRIORS

FIELD

This application is generally related to automatically configuring machine learning models to perform image manipulations. For example, aspects of this application relate to configuring Deep Image Prior (DIP) networks to perform certain image manipulation operations.

BACKGROUND

The removal of unwanted artifacts from images, such as photographs and other illustrations, is a staple operation of various digital image manipulation applications. For instance, users may often want to remove small-scale noise, objects, or other elements of an image in order to improve the quality of the image or otherwise produce an image that satisfies these users' requirements. Operations such as include de-noising, Joint Photographic Experts Group (JPEG) image artifact removal, content-aware filling (e.g., in-painting), and content up-scaling (e.g., super-resolution), among others, require interpolation of existing image pixel data to replace unwanted pixels with aesthetically plausible alternatives. The interpolation of existing pixel data is often performed based on prior assumptions that regularize the synthesis of texture to be smooth or consistent with existing structure in the image. For instance, a digital image manipulation application can exploit the self-similarity of texture patches within natural images for different operations, such as content-aware filling and content up-scaling. This ensures that image defects or holes are repaired in a visually seamless manner, consistent with the rest of the image.

Digital image manipulation applications typically rely on machine learning techniques to determine how best to perform these operations in order to address image defects or otherwise repair and restore images, resulting in better quality images. For instance, some digital image manipulation applications rely on Deep Image Prior (DIP) networks or other convolutional neural networks (CNNs) to exploit the patch self-similarity property explicitly or via a reconstruction prior. DIP networks are desirable as the architectural structure of a CNN (rather than its trained weights) can be used as a prior for image de-noising, in-painting, and super-resolution tasks with desirable results.

However, DIP networks and other CNNs can have several disadvantages. For instance, the quality of results from a DIP network or other CNN is tightly coupled to the choice of network, whereby different images will require different neural networks to act as the prior in order to deliver high quality results. Further, the process by which a DIP network or other CNN is applied to perform these image manipulation tasks is sensitive to certain parameters, such as the number of training epochs. The content specific nature of DIP networks therefore demands tedious hand-crafting of networks, and manual tuning of various parameters, to configure these DIP networks to produce a desired result for a single image. This creates a significant disadvantage, as the configuration of DIP networks can be difficult for the average user.

Techniques and systems are needed for providing a solution that can be used to automatically configure DIP networks and other CNNs to yield high quality image manipulation results.

SUMMARY

Image manipulation systems and related techniques are described herein that perform image processing and restoration using an automated machine learning approach. For instance, in response to obtaining an image, an image manipulation system can determine the reconstruction loss values of a set of neural networks (e.g., encoder-decoder networks, generative neural networks, adversarial neural networks, generative adversarial networks (GANs), any combination thereof, and/or other neural networks) that include different network units (e.g., encoder-decoder pairings) based on the processing of the image using these image processing units. Based on these reconstruction loss values, the image manipulation system can select a subset of networks that can be cross-bred in order to generate a new set of image processing networks. Using this new set of image processing networks, the image manipulation system can obtain new reconstruction loss values for each of these image processing networks. If the image manipulation system determines that the new reconstruction loss values have converged to a point that satisfies a threshold, the image manipulation system can select an image processing network and use this network to process the image.

Additional features and advantages of the present application will be set forth in the description which follows, and in part will be obvious from the description, or may be learned by the practice of the examples provided herein.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and embodiments or examples, will become more apparent upon referring to the following specification, claims, and accompanying drawings.

BRIEF DESCRIPTION OF THE DRAWINGS

Illustrative examples of the present application are described in detail below with reference to the following drawing.

DETAILED DESCRIPTION

Figure 1:
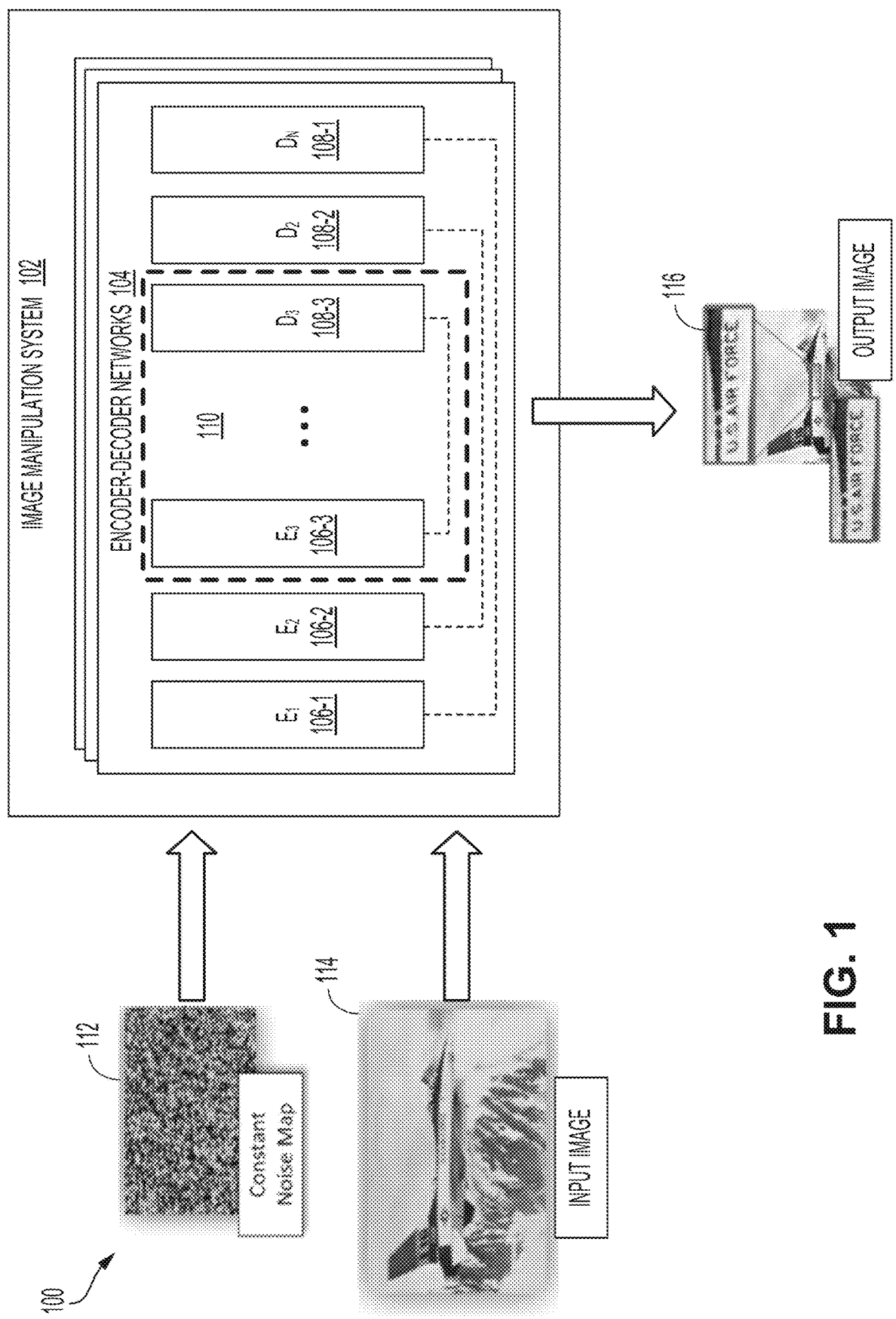
FIG. 1 shows an illustrative example of an environment in which an image manipulation system processes an incoming image using various encoder-decoder networks to identify an encoder-decoder network that can produce a desired output image in accordance with at least one example.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

One or more examples described herein provide benefits and solve one or more of the foregoing or other problems in the art with an image manipulation system and related techniques that use generational cross-breeding among different image processing networks (e.g., image processing neural networks or other machine learning models trained to process images) to select a network that can produce a high quality image output. As described further below, this automated approach provides enhanced performance when compared to other image manipulation approaches using standard DIP networks or other machine learning techniques. For instance, in response to obtaining an image that is to be manipulated (e.g., removal of artifacts and noise, autofilling, super-resolution, etc.), the image manipulation system selects an initial population of different neural networks that can each include a set of network units. These neural networks can include encoder-decoder networks, generative neural networks, adversarial neural networks, generative adversarial networks (GANs), any combination thereof, and/or other neural networks. Encoder-decoder networks are used throughout the present disclosure for the purpose of illustration; however, the description provided herein applies to any type of machine learning model.

The image is manipulated using each of the different neural networks. The neural networks are then scored (e.g., using a fitness score) based on the quality of the output image. Based on the score of each of the different image processing networks, the image manipulation system can select a subset of image processing networks that can be genetically cross-bred in order to create a new population of image processing networks. This new population of image processing networks are then used to process the image and each network is scored based on the quality of the output image. This genetic cross-breeding process is continued until the scores satisfy a threshold corresponding to the desired image quality. When the scores satisfy this threshold, the image manipulation system can select an image processing network that provides the desired results and can use this selected image processing network to create a desired image output.

In some examples, the initial population of image processing networks is randomly selected. In some examples, to generate the initial population of image processing networks, the image manipulation system evaluates the image to determine an image type (e.g., three-dimensional graphic, graphite etching, oil painting, pen and ink drawing, watercolor painting, vector art, photograph, etc.). Based on the image type, the image manipulation system can identify a cluster of image processing networks that yielded desired outputs for other images of the same image type. Using this cluster of image processing networks, the image manipulation system can process the image and obtain fitness scores for each of these image processing networks. Based on these fitness scores, the image manipulation system can select a subset of image processing networks for genetic cross-breeding (e.g., via crossover and mutation) to produce a new population of image processing networks. This process may continue as described above until the scores for a particular generation of image processing networks satisfy the threshold corresponding to the desired image quality. In an example, the image processing networks of this final generation can be used to produce a new cluster of image processing networks that can be initially used to process an image having the same image type that is obtained in the future.

In some examples, an image processing network is made up of a number of image processing units. In one illustrative example, an encoder-decoder neural network can include encoder units and decoder units, which can form paired encoder-decoder units. In some cases, each image processing unit of a network is encoded as a constant length binary sequence. For instance, a given encoder-decoder image processing unit that includes encoder and decoder convolutional stages can be encoded as a set of bits. This set of bits can include a binary indicator of whether the encoder stage of the unit is skipped or bypassed, a filter size learned by the encoder stage, the number of filters of the encoder stage (e.g., channels output by the encoder stage), a binary indicator of whether the decoder stage of the unit is skipped or bypassed, a filter size learned by the up-convolutional decoder stage, and the number of filters of the decoder stage (e.g., channels output by the decoder). Further, the image processing unit can include an additional set of bits that encode a tuple specifying the configuration of skip connections from its encoder stage to each of the decoder stages.

In some examples, the image manipulation system introduces a mutation rate into the genetic cross-breeding of the image processing networks in order to introduce population diversity into the new generation of image processing networks. The mutation rate introduces a probability for flipping one or more bits of an offspring image processing network when the offspring image processing network is generated through genetic cross-breeding of a pair of parent image processing networks. The mutation rate may be selected based on a desired fitness score convergence threshold such that, after a certain number of generation cross-breeding cycles, a resulting generation of image processing networks can satisfy this threshold. The mutation rate can be determined via experimentation using sample images as input to an initial population of image processing networks and determining the converged fitness score for successive generations. Based on the converged fitness score for these successive generations, the image manipulation system can determine a mutation rate that can be used to produce a generation of image processing networks that can satisfy the fitness score threshold for image outputs.

The individual image processing networks selected from the initial population and from successive generations for generational cross-breeding can be selected stochastically and with replacement. For instance, image processing networks that produce higher quality outputs (e.g., having higher fitness scores) are more likely to be selected for cross-breeding. However, as noted above, population diversity can be a driver for selecting image processing networks for the generational cross-breeding. Thus, in some examples, elitism can be applied whereby a bottom percentage of image processing networks are culled and an upper percentage of image processing networks are passed unperturbed into the successive generation (e.g., not bred with other networks). The remaining percentage of image processing networks are genetically cross-bred subject to the mutation rate described above in order to generate a new population of image processing networks for the successive generation.

To determine the score for each image processing network, the image manipulation system determines a reconstruction loss value that can be used as a parameter in determining the score. In an example, the reconstruction loss value is determined using a reconstruction loss function that is specific to the operation to be performed on the image to generate the image output. For instance, the reconstruction loss function corresponding to a de-noise operation can be different from the reconstruction loss function corresponding to an in-painting or super-resolution operation. Thus, the image manipulation system determines, based on the type of processing to be performed on the image, which reconstruction loss function is to be used as part of the calculation of the fitness score for each image processing network of the population. This can result in different generations of image processing networks being generated based on the type of operation that is to be performed, even if the initial population is similar.

The image manipulation system and related techniques described herein provide several advantages over conventional systems implementing DIP and other CNNs for image manipulation. For example, by performing an evolutionary search for an image processing network that can manipulate an image to produce the desired results, the image manipulation system can automatically improve the image processing structure and parameters of the DIP network, which can serve as a content-specific prior to regularize these single image manipulation tasks. These improved structures further result in the improvement of the visual quality of classical DIP solutions for a diverse range of photographic and artistic content.

FIG. 1 shows an illustrative example of an environment 100 in which an image manipulation system 102 processes an incoming image 114 using various encoder-decoder networks 104 to identify an encoder-decoder network that can produce a desired output image 116 in accordance with at least one example. In the environment 100, an image manipulation system 102 obtains a request to manipulate an input image 114 in order to generate an image of higher quality or to otherwise change one or more aspects of the input image 114. For example, a user may submit a request to the image manipulation system 102 to perform a de-noising operation on a provided image in order to improve one or more features of the image. As an illustrative example, a user submitting an input image 114 may wish to de-noise the "U.S. AIR FORCE" lettering on the aircraft portrayed in the input image 114 such that the resulting output image 116 provides a clearer representation of the "U.S. AIR FORCE" lettering on the aircraft portrayed in the output image 116. As another example, a user may submit a request to perform an in-painting operation in order to repair holes or other defects of the input image 114. As yet another example, a user may submit a request to perform a super-resolution operation on an input image 114 to increase the resolution of the provided image. It should be noted that while de-noise, in-painting, and super-resolution operations are described extensively throughout the present disclosure for the purpose of illustration, other image manipulation operations may be performed by the image manipulation system 102 and are thereby within the scope of the present disclosure.

In an example, the image manipulation system 102 is configured to perform an automatic network search for a DIP network or other CNNs. For instance, the image manipulation system 102 may be configured to learn a neural network, such as a generative CNN $G_\theta$ (wherein $\theta$ are the learned network parameters or weights), to reconstruct an image x from a noise map N (e.g., noise map 112, as illustrated in FIG. 1). While a generative CNN $G_\theta$ is used as an example herein, other neural networks or machine learning models can be used. The noise map 112 may be of identical height and width to the image x (e.g., input image 114), with pixels drawn from a uniform random distribution. The image manipulation system 102 may implement a set of encoder-decoder networks 104 with skip connections for $G_\theta$, comprising different pairs of convolutional layers with varying networks 104 depending on the image manipulation operation (e.g., de-noising, in-painting, super-resolution, etc.) and the image content that is to be processed. To learn $G_\theta$ for a single given image x, a reconstruction loss, $\theta^*$ (e.g., Eq. 1), is applied.

$$\theta^* = \underset{\theta}{\mathrm{argmin}} \|G_\theta(N) - x\|_2^2 \qquad \text{(Eq. 1)}$$

Each encoder-decoder network 104 implemented by the image manipulation system 102 may include one or more encoder units (e.g., encoder $E_1$ 106-1, encoder $E_2$ 106-2, encoder $E_3$ 106-3, etc.) and one or more decoder units (e.g., decoder $D_1$ 108-1, decoder $D_2$ 108-2, decoder $D_3$ 108-3, etc.). In an example, the image manipulation system 102 encodes the space of the encoder-decoder networks 104 from which to sample network G as a constant length binary sequence, representing N paired encoder-decoder units U={$U_1$, ... $U_N$}. For instance, a given encoder-decoder unit $U_n$ comprises encoder $E_n$ and decoder $D_n$ convolutional stages. Each of these stages may require a particular number of bits to encode its parameter tuple. Further, in an example, a unit $U_n$ can be encoded to include a set of bits corresponding to the configuration of skip connections from its encoder stage to each of the decoder stages. As an illustrative example, if each of the unit $U_n$ requires seven bits to encode the parameter tuple for each of the encoder stage and decoder stage, and a 4N-bit block to encode the tuple specifying the configuration of the skip connections from the encoder stage to each of the decoder stages, the total binary representation for an encoder-decoder network in a neural network search for DIP is N(14+4N). In some instances, the binary representation for an encoder-decoder network includes an additional two bits that may denote the maximum epoch count, resulting in a total binary representation for an encoder-decoder network in the neural network search for DIP being N(14+4N)+2. The number of encoder or decoder stages may vary according to the skip connections which may bypass the stage.

As noted above, each encoder-decoder unit 110 can be represented using a binary representation. For instance, an encoder-decoder unit 110 may include a binary representation as provided below, where super-scripts indicate elements of the parameter tuple. It should be noted that the number of bits described below represent an illustrative example of different elements that may be encoded using binary representation. Other implementations may include additional, alternative, or fewer elements requiring additional or fewer bits as needed.

Illustrative examples of binary indications that can be used for a binary representation of an encoder-decoder unit (e.g., encoder-decoder unit 110) are as follows, for an encoder-decoder unit $U_n$:

$E_n^s \in [0,1]$ (1 bit) a binary indicator of whether the encoder stage of the encoder-decoder unit 110 is skipped (represented by the "s" in the indicator) or otherwise bypassed. In one example, a value of 1 for $E_n^s$ denotes that the encoder stage is skipped and a value of 0 for $E_n^s$ denotes that the encoder stage is not skipped.

$E_n^f \in [0,7]$ (3 bits) encoding filter size $f=2E_n^f+1$ learned by the convolutional encoder.

$E_n^h \in [0,7]$ (3 bits) encoding number of filters $$h = 2^{E_n^h-1},$$

e.g., channels output by the encoder stage.

$D_n^s \in [0,1]$ (1 bit) a binary indicator of whether the decoder stage of the encoder-decoder unit 110 is skipped or otherwise bypassed. In one example, a value of 1 for $D_n^s$ denotes that the decoder stage is skipped and a value of 0 for $D_n^s$ denotes that the decoder stage is not skipped.

$D_n^f \in [0,7]$ (3 bits) encoding filter size $f=2D_n^f+1$ learned by the up-convolutional decoder stage.

$D_n^h \in [0,7]$ (3 bits) encoding number of filters $$h = 2^{D_n^h-1},$$

e.g., channels output by the decoder stage.

$R_n \in B^{4N}$ (4N bits) encoding gated skip connections as $[\rho_n^1, \ldots, \rho_n^N]$, wherein each 4-bit group $\rho_n^i \in [0,15]$ determines whether gated skip path $r_n^i$ connects from encoder $E_n$ to decoder $D_i$ and, if so, how many filters/channels are present (e.g., a skip connection gate is open if $r_n^i=0$).

In an example, the image manipulation system 102 can further include, as part of an encoder-decoder network 104, image processing units that force $E_n=D_n$ for all parameters, thus forcing a symmetric encoder-decoder network to be learned. This may result in fewer bits needing to be encoded for the corresponding image processing units. Thus, the image manipulation system 102 may provide various symmetric and asymmetric encoder-decoder networks 104 for processing of an input image 114 and a noise map 112 to generate an output image for evaluation.

In an example, the image manipulation system 102 identifies an initial population of image processing networks 104 that may be used to process the noise map 112 to generate an output image. The output image generated by each image processing network may be evaluated against the original input image 114 to determine a reconstruction loss value that may be used to calculate a fitness score for the image processing network. The function utilized to calculate the reconstruction loss value may differ based on the operation being performed. For instance, the loss function for a de-noising operation may differ from the loss function for an in-painting or super-restoration operation. As described below, Eq. 2 is representative of a loss function for a de-noising operation, Eq. 3 is representative of a loss function for an in-painting operation, and Eq. 4 is representative of a loss function for a super-resolution operation. In lieu of a ground truth image, the image manipulation system 102 employs a perceptual measure or other fitness score to assess the visual quality generated by any candidate network by training the network via backpropagation to minimize the operation specific reconstruction loss, as represented in Eqs. 2-4 below:

$$\mathcal{L}_{de-noise}(x;G) = \min_\theta |G_\theta(N)-x| \quad \text{(Eq. 2)}$$

$$\mathcal{L}_{in-painting}(x;G) = \min_\theta |M(G_\theta(N))-M(x)| \quad \text{(Eq. 3)}$$

$$\mathcal{L}_{super-resolution}(x;G) = \min_\theta |D(G_\theta(N))-x| \quad \text{(Eq. 4)}$$

As noted above, $G_\theta$ is generative CNN or other neural network or machine learning model, N is the noise map, and x is an input image. Eq 2 minimizes the loss between $G_\theta$ (given the noise map N) and the input image x. In Eq. 3, which defines the reconstruction loss function for an in-painting operation, M(.) is a masking operator that returns a zero value within the region that is to be in-painted. Thus, the reconstruction loss function for an in-painting operation results in a reconstruction loss value being returned for regions of the image outside of the region that is to be in-painted. This may allow each encoder-decoder network to generate any solution within the region that is to be in-painted from the noise map 112 without being subject to constraints resulting from the reconstruction loss function. However, since the encoder-decoder networks 114 may be evaluated based on their respective performance in reconstructing the regions outside of the in-painting region, the image manipulation system 102 may use the reconstruction loss function defined in Eq. 3 to select encoder-decoder networks for defining successive generations of encoder-decoder networks. In Eq. 4, which defines the reconstruction loss function for an upscaling or super-resolution operation, the variable D represents a downsampling operator that reduces the target to the size of the input image 114 (e.g., x) via bi-linear interpolation.

In an example, the image manipulation system 102 calculates the reconstruction loss function for each encoder-decoder network of the initial population of encoder-decoder networks and determines, based on the resulting reconstruction loss value for each encoder-decoder network, an individual fitness score for each encoder-decoder network. For instance, the image manipulation system 102 may assess, using a learned perceptual measure, the visual quality $\hat{x}$ of the output image generated by an encoder-decoder network. This learned perceptual measure may be defined via Eq. 6 below.

$$f(G_i) = P(\text{argmin}_{\hat{x}} \mathcal{L}(\hat{x}; G_\theta)) \quad \text{(Eq. 6)}$$

In Eq. 6, $\mathcal{L}$ defines the operation specific reconstruction loss value and P(.) is the resulting perceptual or fitness score for a given individual encoder-decoder network $G_i$ in the population of encoder-decoder networks. It should be noted that other functions may be utilized to determine the fitness score for each encoder-decoder network, whereby these other functions may be selected based on experimentation and the resulting quality of output images after successive generations. For instance, structural similarity (SSIM) and/or peak-signal-to-noise ratio (PSNR) indices may be used to determine a fitness score for each encoder-decoder network.

The perceptual measure defined in Eq. 6 may be used to determine a Learned Perceptual Image Patch Similarity (LPIPS) metric to determine the fitness of a particular network. The LPIPS metric is determined via training of a classification CNN backbone using a dataset of reference patches that have been subject to distortion (e.g., Berkeley-Adobe Perceptual Path Similarity (BAPPS) dataset, etc.). Crowd annotation may be used to collect the dataset of reference patches and to capture human judgment on whether each pair of patches (reference and distorted reference) appear to be similar using a cross-entropy loss. This may allow a network to approximate a similar comparison function to human perception. In some instances, the network is sampled across multiple layers with samples aggregated via a linear layer to obtain a perceptual loss similar to the perceptual losses used via neural stylization approaches.

In an example, the image manipulation system 102 selects, from the initial population of encoder-decoder networks 104, a subset of encoder-decoder networks that can be used to create a new generation of encoder-decoder networks for processing of the noise map 112 to generate an output image. The image manipulation system 102 may stochastically select, with replacement, the subset of encoder-decoder networks based on the fitness scores of the encoder-decoder networks of the initial population encoder-decoder networks 104. This may result in encoder-decoder networks that produce higher quality output images (e.g., encoder-decoder networks having better fitness scores) being more likely to be selected. In an example, the image manipulation system 102 is configured to promote population diversity for successive generations. Thus, the image manipulation system 102 may apply elitism in its selection process for identifying the subset of encoder-decoder networks for creating a successive generation population. For instance, the image manipulation system 102 may automatically cull from the initial population the encoder-decoder networks having a fitness score within a bottom percentile while automatically passing encoder-decoder networks having a fitness score within a top percentile on to the next generation unperturbed. The remaining encoder-decoder networks of this initial population, in an example, are used to produce the remainder of the next generation.

In an example, the image manipulation system 102 utilizes genetic cross-breeding among the remaining encoder-decoder networks of the initial population to produce, along with the encoder-decoder networks having fitness scores within a top percentile, the next generation of encoder-decoder networks for evaluation. For instance, from the remaining encoder-decoder networks, the image manipulation system 102 may stochastically select two individual encoder-decoder networks with a bias towards fitness and utilize genetic cross-breeding via crossover and mutation to produce a novel offspring encoder-decoder network for the next generation. In an example, the image manipulation system 102 introduces a mutation rate that may be used to introduce random mutations into the offspring genome. For instance, each bit within the offspring genome may be subject to a random flip with low probability (e.g., mutation rate). The mutation rate may be determined based on a desired convergence level for the resulting fitness score in successive generations, which may correlate to a higher quality output image for each operation.

For network breeding via genetic crossover, given two constant length binary genomes (e.g., networks), a splice point is randomly selected such that units from the parent encoder-decoder networks are combined via copying of a first set of encoder-decoder units of the first parent encoder-decoder network with a second set of encoder-decoder units of the second parent encoder-decoder network. In some instances, this may result in the creation of syntactically invalid genomes (e.g., due to tensor size incompatibilities between units in the genome, etc.). During subsequent evaluations, these invalid genomes may result in a zero value for their fitness scores, which results in their culling during the stochastic selection of encoder-decoder networks for the next generation.

In an example, the image manipulation system 102 continues to perform the aforementioned breeding via genetic crossover for successive encoder-decoder network generations until the fitness scores of the encoder-decoder networks of a particular generation satisfy a threshold fitness level. If the image manipulation system 102 determines that the fitness scores of the encoder-decoder networks in a particular generation have converged on a value that satisfies the threshold fitness level, the image manipulation system 102 may select from this population an encoder-decoder network that provides the highest quality output image 116 for the operation performed for manipulation of the input image 114. For instance, the image manipulation system 102 may select the encoder-decoder network that has produced an output image with the best fitness score. Using this encoder-decoder network, the image manipulation system 102 may generate the output image 116, which may be provided in response to the request to manipulate the input image 114.

Figure 2:
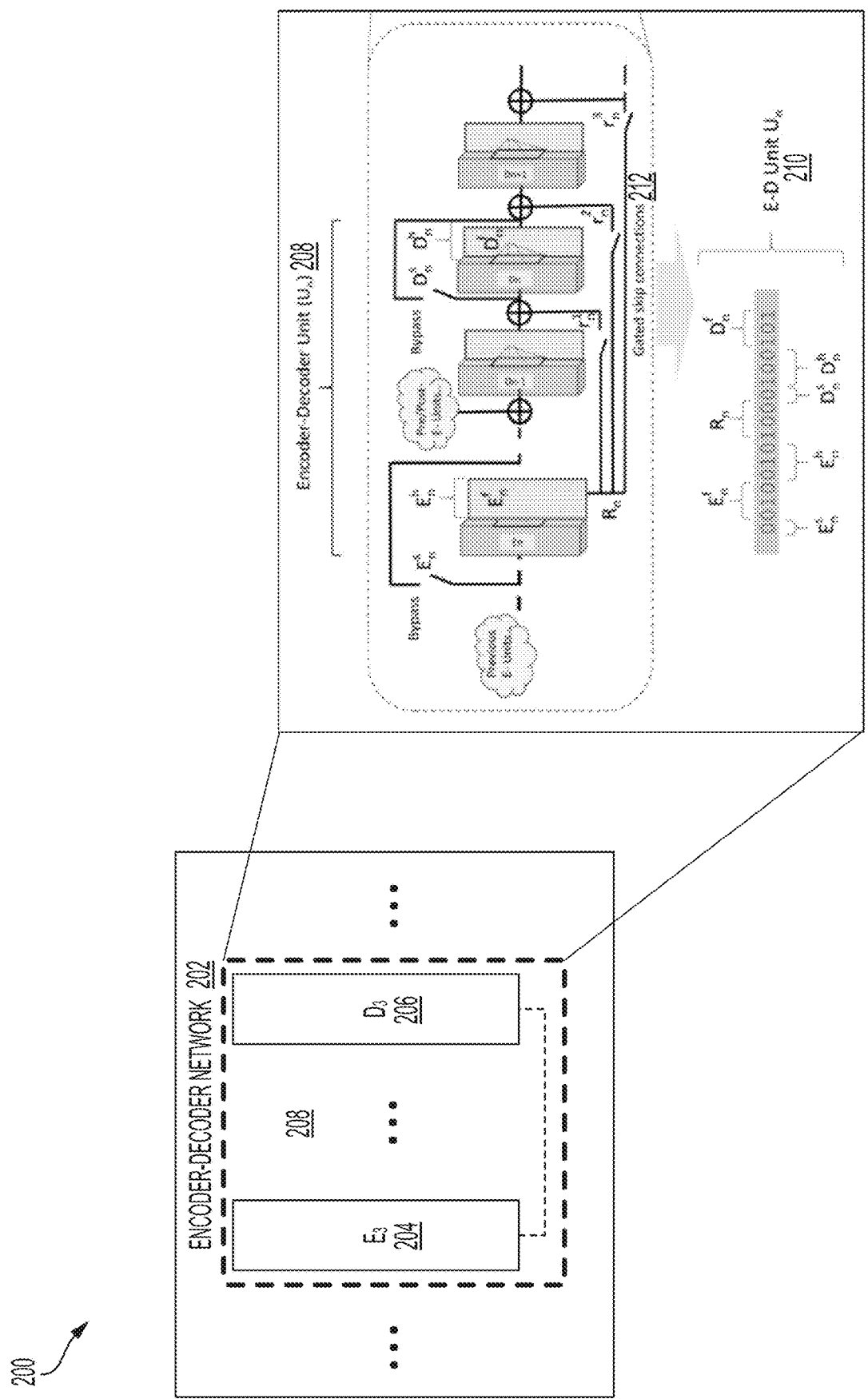
FIG. 2 shows an illustrative example of an environment in which elements of an encoder-decoder unit are represented using a series of bits in accordance with at least one example.

FIG. 2 shows an illustrative example of an environment 200 in which elements of an encoder-decoder unit 208 are represented using a series of bits in accordance with at least one example. As noted above, each encoder-decoder unit 208 of an encoder-decoder network 202 includes a set of encoder convolutional stages 204 and a set of decoder convolutional stages 206. In an example, each encoder-decoder unit 208 can be encoded using a series of bits, wherein a set number of bits are used to encode the parameter tuple of the encoder convolutional stages 204 and of the decoder convolutional stages 206. For instance, as described above in connection with FIG. 1, the bit string 210 for the encoder-decoder unit 208 may encode, for the encoder 204, a binary indicator of whether the encoder stage of the encoder-decoder unit 208 is skipped or otherwise bypassed, the filter size learned by the encoder 204 and the number of filters output by the encoder stage. For the decoder 206, the bit string 210 for the encoder-decoder unit 208 may encode a binary indicator of whether the decoder stage of the encoder-decoder unit 208 is skipped or otherwise bypassed, the filter size learned by the decoder 206 and the number of filters output by the decoder stage.

Further, the bit string 210 of the encoder-decoder unit 208 can include a tuple specifying the configuration of skip connections from the encoder stage to each of the decoder stages of the encoder-decoder unit 208. For instance, the bit string 210 can encode the gated skip connections 212 for the encoder-decoder unit 208, whereby the bits may be used to determine whether a gated skip path connects from the encoder 204 to the decoder 206 and, if so, how many filters/channels are present. In an example, the bit string 210 for the encoder-decoder unit 208 includes a set of bits corresponding to the maximum epoch count for the unit 208. The maximum epoch count may defined as $=500*(2^t-1)$, where t is represented using the set of bits. Thus, based on the corresponding value of the set of bits (e.g., t), the image manipulation system may determine, using T, the maximum number of epochs for the unit 208.

Through this binary representation of the various encoder-decoder units, the image manipulation system may obtain a total binary representation for an encoder-decoder network 202 in a neural network search for DIP. The binary representation for each encoder-decoder network of a given population may be used by the image manipulation system to perform breeding of selected encoder-decoder networks via genetic crossover in order to generate a new population of encoder-decoder networks. For instance, given two constant length binary bit strings for a pair of encoder-decoder networks, the image manipulation system may randomly select a splice point and combine the two binary bit strings at this splice point, resulting in a new offspring encoder-decoder network. This new offspring encoder-decoder network is added to the new population of encoder-decoder networks for evaluation. As noted above, this process may be performed subject to a mutation rate, whereby one or more bits may be flipped subject to the mutation rate in order to promote population diversity.

Figure 3:
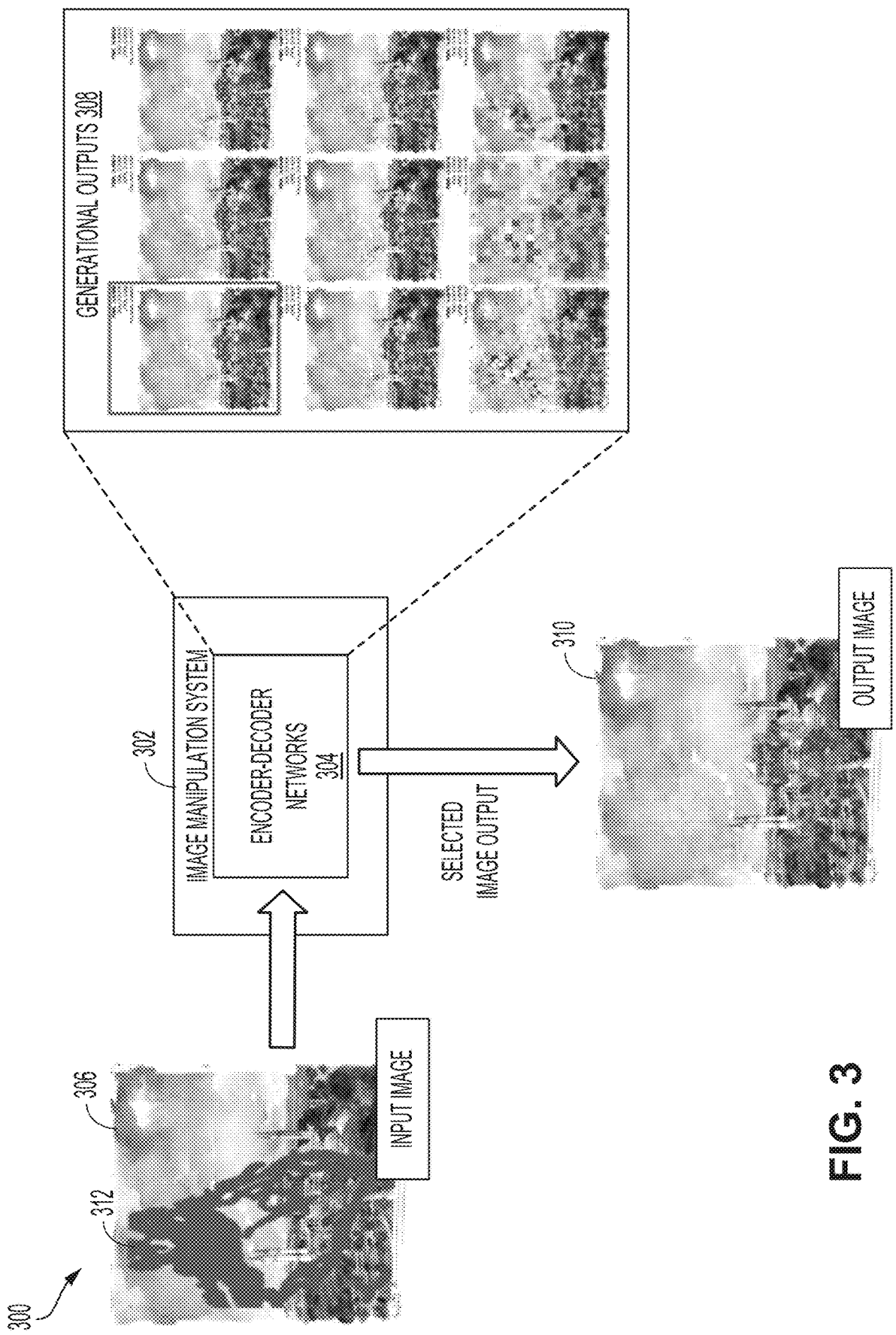
FIG. 3 shows an illustrative example of an environment in which an image manipulation system performs generational cross-breeding of encoder-decoder networks to obtain a converged solution that satisfies a performance threshold in accordance with at least one example.

FIG. 3 shows an illustrative example of an environment 300 in which an image manipulation system 302 performs generational cross-breeding of encoder-decoder networks 304 to obtain a converged solution that satisfies a performance threshold in accordance with at least one example. In the environment 300, an image manipulation system 302 obtains an input image 306 for which one or more manipulation operations are to be performed. For instance, the image manipulation system 302 may receive a request to perform a super-resolution operation on a provided image in order to improve the resolution or otherwise upscale the provided image. As another example, the image manipulation system 302 may receive a request to perform a de-noising operation to reduce the random noise of the image 306. In another example, the image manipulation system 302 may receive a request to perform various in-painting operations in order to restore an input image 306 to a desired state. For example, as illustrated in FIG. 3, the input image 306 may include various defect regions 312 or "holes" in the image 306 that a requestor may want restored via an in-painting process.

In response to obtaining the input image 306, the image manipulation system 302 may determine what operations are to be performed in order to restore or otherwise manipulate the input image 306. For instance, the image manipulation system 302 may identify the operations that are to be performed from the request to manipulate the input image 306. Alternatively, the image manipulation system 302 may evaluate the input image 306 to identify any defect regions 312 that may be encoded with an indicator that these defect regions 312 are to be in-painted by the image manipulation system 302.

In an example, in response to obtaining the input image 306, the image population system 302 generates an initial population of encoder-decoder networks 304 that can include a random selection of different encoder-decoder networks 304 that may be used to generate an output image 310 from a randomly selected noise map having the same dimensions as the input image 306. The pixels of the noise map may have pixels drawn from a uniform random distribution. As noted above, each encoder-decoder network may be encoded as a constant length binary sequence, representing a number of paired encoder-decoder units. The number of paired encoder-decoder units for a network may be determined based according to the skip connections which may bypass a stage.

The image processing system 302 may process the noise map using each of the encoder-decoder networks 304 of the initial population to generate, for each network, an output image. The image processing system 302 may evaluate the output image generated by each network to determine a fitness score for each of these networks. For instance, in an example, in lieu of a ground truth image, the image manipulation system 302 employs a perceptual measure or other fitness score to assess the visual quality generated by any candidate network by training the network via backpropagation to minimize the operation specific reconstruction loss. As noted above and represented in Eqs. 2-4, each operation may have a corresponding reconstruction loss function that may be used to determine the reconstruction loss value for the networks performing the operation. Thus, for each network in the initial population, the image manipulation system 302 may determine the loss value of the network. Using the loss value as a parameter, the image manipulation system 302 may calculate the fitness score for each network.

As noted above, the image manipulation system 302 breeds selected encoder-decoder networks from the initial population via genetic crossover, subject to a mutation rate, to generate a new population of encoder-decoder networks. For instance, the image manipulation system 302 may stochastically select, with replacement, different encoder-decoder networks from the initial population by using elitism. This may cause the image manipulation system 302 to cull any underperforming encoder-decoder networks that have a resulting fitness score within a particular bottom percentile of the population. Further, the image manipulation system 302 may automatically include in the new population any encoder-decoder networks that are within an upper percentile of the population. All other encoder-decoder networks may be cross-bred subject to a mutation rate as described above.

With each successive generation, the image manipulation system 302 may evaluate the generational outputs 308 to determine whether a population of encoder-decoder networks has achieved a fitness score convergence level that satisfies a fitness score threshold. For instance, with each successive generation, the fitness score may converge towards a particular level. The fitness score convergence level may be a function of the mutation rate as described above. If the fitness score convergence level satisfies the fitness score threshold, the image manipulation system 302 may select an encoder-decoder network from the population that produces an output image having a desired fitness score compared to that of the other networks of the population. Using this selected encoder-decoder network, the image manipulation system 302 may produce an output image 310.

Figure 4:
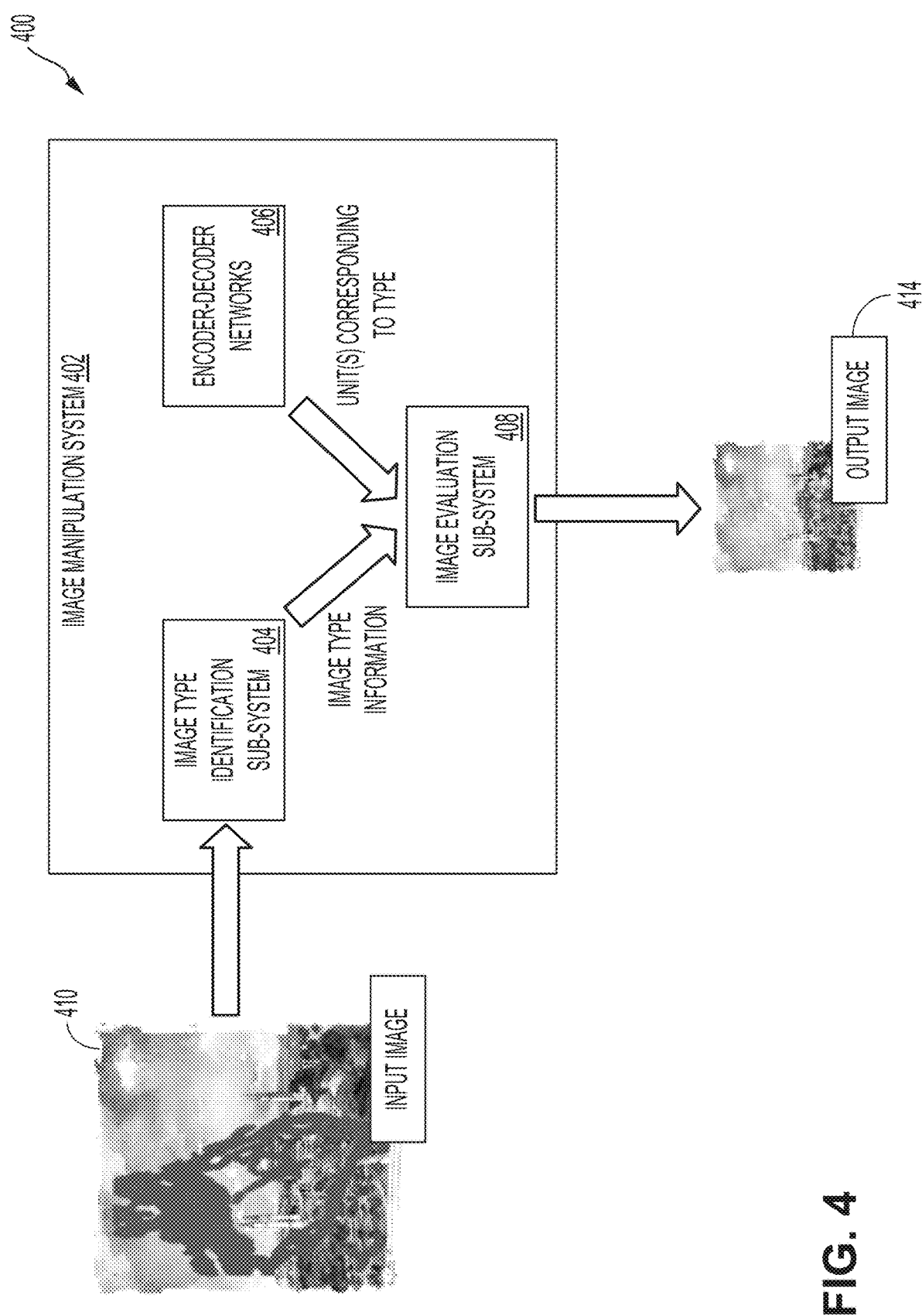
FIG. 4 shows an illustrative example of an environment in which an image manipulation system identifies an initial population of encoder-decoder networks for manipulation of an image based on an image type in accordance with at least one example.

In an example, the image manipulation system may select an initial population of encoder-decoder networks based on the image type, as well as historical data with regard to the manipulation of images having the same image type as the input image. Accordingly, FIG. 4 shows an illustrative example of an environment 400 in which an image manipulation system 402 identifies an initial population of encoder-decoder networks for manipulation of an image 410 based on an image type in accordance with at least one example. In the environment 400, the image manipulation system 402 obtains an input image 410 for which one or more manipulations are to be performed. This may include performance of in-painting, de-noising, upscaling (super-resolution), and/or other image manipulation operations.

In response to obtaining an input image 410, the image manipulation system 402, via an image type identification sub-system 404, may evaluate the input image 410 to determine the type of image that is to be manipulated. For instance, the image type identification sub-system 404 may evaluate the input image 410 to determine a particular visual style of the image 410. In some examples, the image type identification sub-system 404 can apply a machine learning system (e.g., a neural network, such as a classification convolutional neural network (CNN) or other type of neural network) on the input image 410 to classify the image (i.e., detect a type or class of the image 410), which can then be used to identify a distribution of possible neural network architectures to initially seed from, as described below. Additionally, or alternatively, the image type identification sub-system 404 may identify the file type of the input image 410. The image type identification sub-system 404 may provide image type information to an image evaluation sub-system 408, which can use this information to select the initial population of encoder-decoder networks for performance of an operation to manipulate the input image 410.

In an example, the image evaluation sub-system 408 identifies, based on the image type information from the image type identification sub-system 404, a set of encoder-decoder networks 406 that may be used to generate an initial population of encoder-decoder networks 406 for processing an input image 410. For instance, using one or more machine learning techniques, the image evaluation sub-system 408 may identify different clusters of encoder-decoder networks that provide desired performance (e.g., fitness scores) for particular image types (e.g., for oil paintings, for graphite sketches, for water color paintings, and/or other type of image). As noted above, in some cases, an initial population of encoder-decoder networks can include a random selection of different encoder-decoder networks. Identifying a population or cluster of encoder-decoder network architectures that are known to be good for a particular type of image can be performed as an alternative to selecting a population of network architectures from a completely random starting point (e.g., a randomly seeded population of network architectures). In some cases, using image types to select the initial population of network architectures can make the search over the population converge faster. These clusters may each include unique populations of encoder-decoder networks discovered through past genetic crossover breeding for manipulating images of the same type as the input image 410 using similar operations.

The image evaluation sub-system 408 may use a particular cluster of encoder-decoder networks corresponding to the image type as the initial population for processing of a noise map to generate an output image Similar to the process described above, the image evaluation sub-system 408 may breed individual encoder-decoder networks of this initial population via genetic crossover with mutation in order to generate a new generation of encoder-decoder networks to generate an output image. Thus, the image evaluation sub-system 408 may continue to stochastically select individual networks for breeding and for inclusion in successive generations of encoder-decoder networks until there is a convergence in the resulting fitness score for the population that satisfies a fitness score threshold. The image evaluation sub-system 408 may select an encoder-decoder network that provides a desired level of performance from this final generation and use this encoder-decoder network to generate an output image 414. The final generation of encoder-decoder networks may be used to generate a new cluster for the particular image type. This may guide the image evaluation sub-system 408 in response to future requests to manipulate an input image of the same type.

Figure 5:
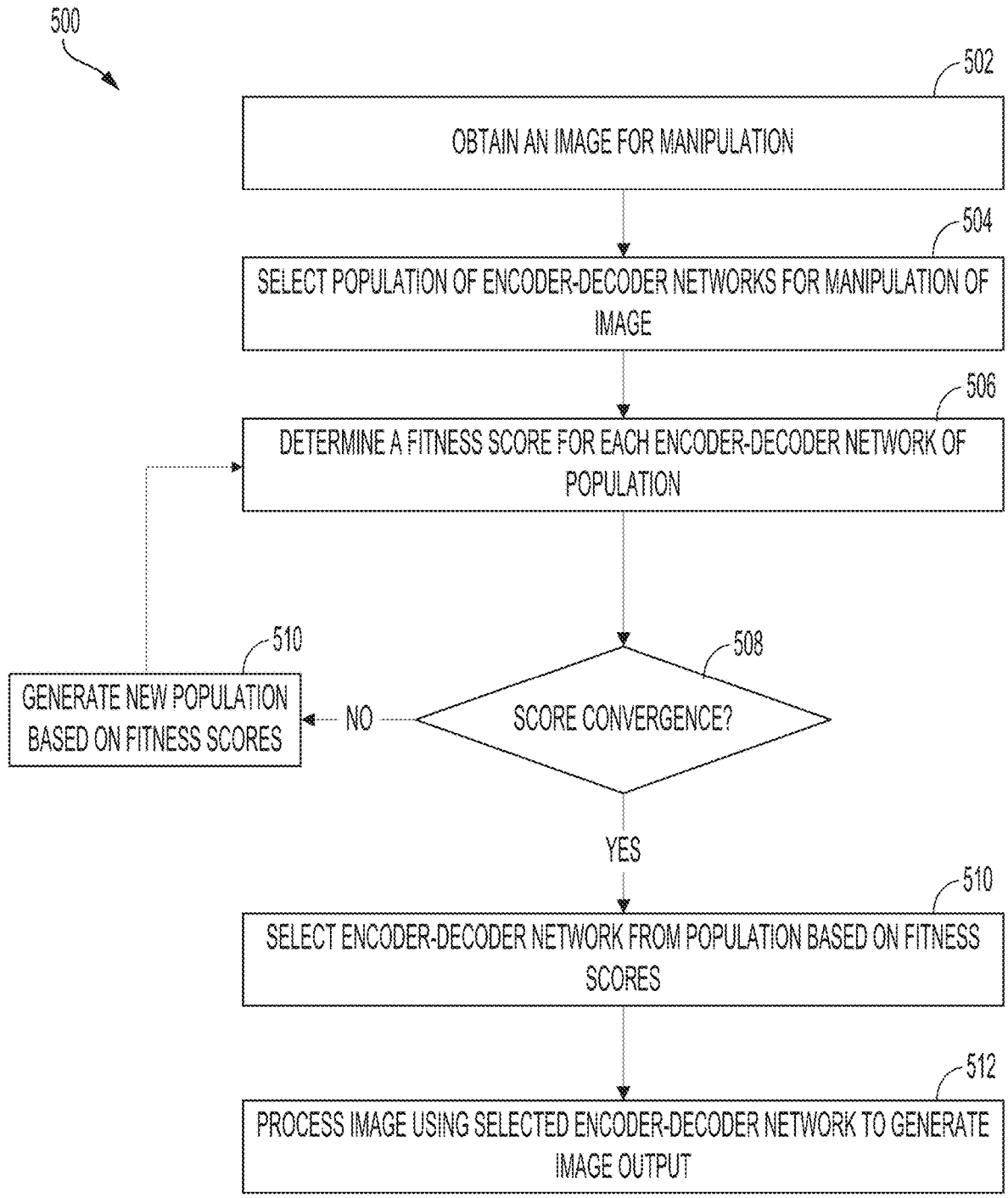
FIG. 5 shows an illustrative example of a process for manipulating an image using an encoder-decoder network generated via generational cross-breeding of encoder-decoder networks and selected based on a fitness score of the encoder-decoder network in accordance with at least one example.

FIG. 5 shows an illustrative example of a process 500 for manipulating an image using an encoder-decoder network generated via generational cross-breeding of encoder-decoder networks and selected based on a fitness score of the encoder-decoder network in accordance with at least one example. The process 500 may be performed by the image manipulation system described above in connection with FIGS. 1-4. The image manipulation system may maintain various encoder-decoder networks that may be used in a DIP network or other CNN to process a noise map in order to generate, from the noise map, an output image that represents a manipulated input image that achieves a level of fitness (e.g., produces desired results as if the input image was manipulated via performance of one or more manipulation operations).

At operation 502, the image manipulation system obtains an image that is to be manipulated in order to restore the image or otherwise change one or more features of the image. For instance, the image manipulation system may receive a request to de-noise one or more features of a provided image in order to improve the clarity of these one or more features in the image. Alternatively, the image manipulation system may receive a request to in-paint one or more regions of the image, whereby these one or more regions may include defects or "holes" that are to be in-painted in order to improve the quality of the image and enhance certain details of the image that may otherwise be missing. As another example, the image manipulation system may receive a request to upscale or otherwise improve the resolution (e.g., super-resolution) of an existing image in order to improve the quality of the image.

In response to obtaining an input image for manipulation, the image manipulation system, at operation 504, selects a population of encoder-decoder networks for manipulation of the image. In an example, the image manipulation system initializes the population with a set number of encoder-decoder networks by sampling a pool of possible encoder-decoder combinations to seed initial encoder-decoder networks. Each of these encoder-decoder networks may be encoded as a constant length binary sequence, representing a set number of paired encoder-decoder units, as described above. The image manipulation system may process a noise map using each of the encoder-decoder networks of the initial population to obtain an output image that may be used to evaluate the performance of each of these encoder-decoder networks.

At operation 506, the image manipulation system determines a fitness score for each encoder-decoder network of the population. As described above, the image manipulation system uses an operation specific reconstruction loss function to determine the reconstruction loss value for each output image generated by each encoder-decoder network of the population. For instance, the reconstruction loss function for an in-painting operation may include a masking operator that returns a zero value within the regions that are to be in-painted. As another example, the reconstruction loss function for an upscaling operation may include a downsampling operator that reduces its target to the size of the input image via bi-linear interpolation. The resulting reconstruction loss value for an encoder-decoder network may be used as a parameter in a perceptual measure or other fitness score function to determine the fitness score for the encoder-decoder network. The image manipulation system may calculate the fitness score for each encoder-decoder network based on the quality or "fitness" of the output image generated by each of the encoder-decoder networks compared to the input image.

At operation 508, the image manipulation system determines whether the resulting fitness scores for the population have converged. For instance, the image manipulation system may determine whether the maximum fitness score for the population is within a certain percentage of the maximum fitness score of prior populations. If so, the image manipulation system may determine that score convergence has been achieved. For the initial population, convergence may not be obtained, as there are no prior populations to compare the resulting maximum fitness score to. Thus, at operation 510, the image manipulation system may generate a new population based on the fitness scores of each of the encoder-decoder networks of the population.

To generate the new population of encoder-decoder networks, the image manipulation system may cull the lowest scoring encoder-decoder networks from a bottom percentile tier. Further, the image manipulation system may automatically add the highest scoring encoder-decoder networks from an upper percentile tier to the new population for the next generation of encoder-decoder networks. The remaining encoder-decoder networks of the old population may be bred via genetic crossover subject to a mutation rate. For instance, from this population of remaining encoder-decoder networks, the image manipulation system may select two encoder-decoder networks stochastically with a bias to fitness for breeding. The image manipulation system may select a random splice point for the binary genomes of these two encoder-decoder networks and combine the two encoder-decoder networks by copying the encoder-decoder units of the encoder-decoder networks at the splice point. This may result in a new offspring encoder-decoder network that is added to the new population. This process is repeated until the size of the new population mirrors that of the past generation.

Once the new population of encoder-decoder networks has been generated for the new generation, the image manipulation system may process the noise map using this new population of encoder-decoder networks to determine, at operation 506, a fitness score for each encoder-decoder network of the new population. The image manipulation system may also again determine, at operation 508, whether the resulting fitness scores for the new population have converged. Thus, the image manipulation system may continue to perform this iterative process of generating new populations so long as the resulting fitness scores have not converged for a set number of successive generations.

If the image manipulation system detects that the maximum fitness score for the present generation of encoder-decoder networks has reached convergence with a set number of prior generations, the image manipulation system, at operation 510, selects an encoder-decoder network from this population based on the fitness scores of the population. For instance, the image manipulation system may select an encoder-decoder network having the best fitness score (e.g., highest based on scaling of fitness scores, etc.) among the population of encoder-decoder networks. As noted above, the best fitness score may correspond to the highest quality output image generated by an encoder-decoder network when compared to the original input image and the desired operation that was to be performed on the original input image. At operation 512, the image manipulation system may use the selected encoder-decoder network to process the input image and generate an output image that may be provided.

Figure 6:
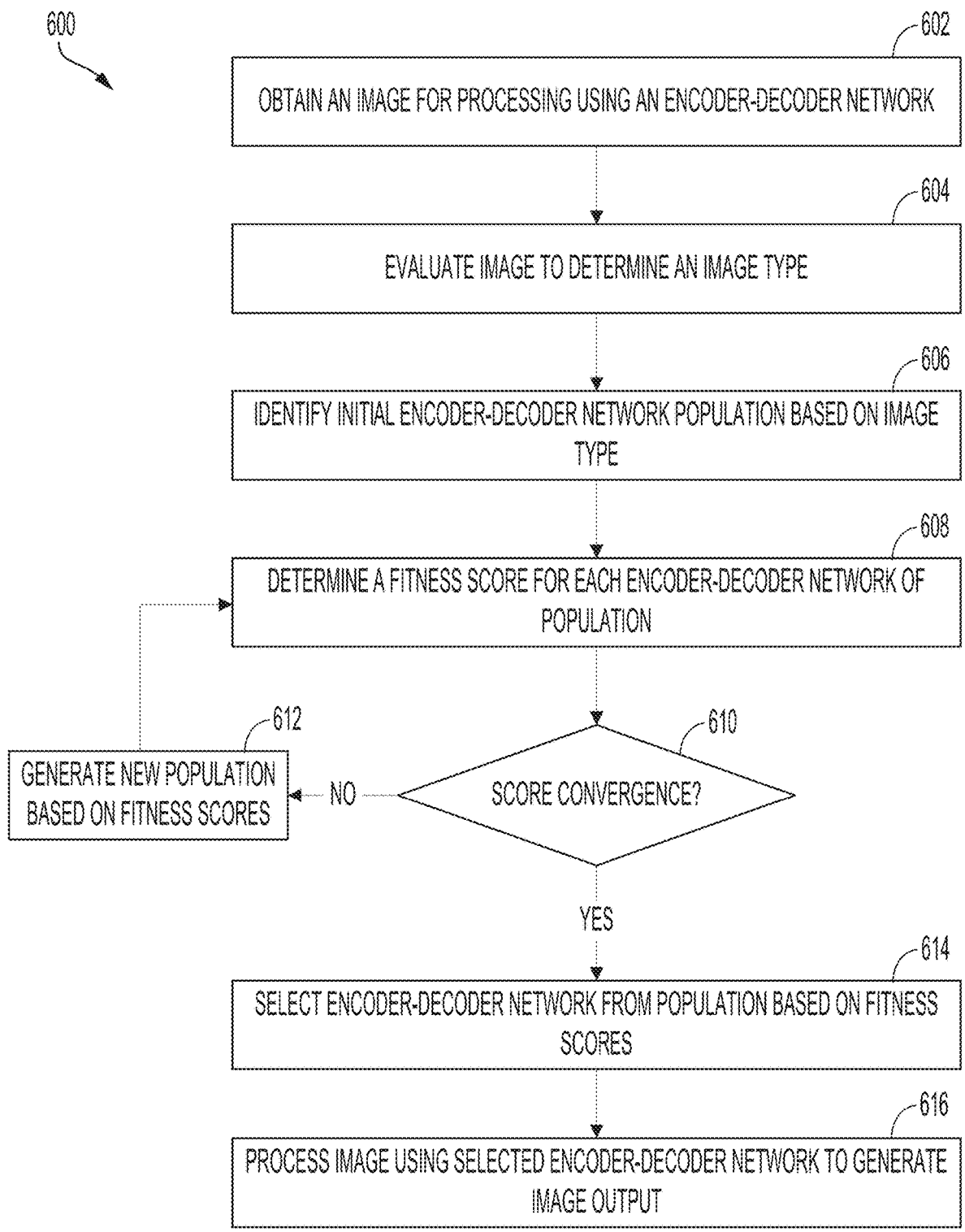
FIG. 6 shows an illustrative example of a process for manipulating an image using an encoder-decoder network generated via generational cross-breeding of a population of encoder-decoder networks selected based on an image type in accordance with at least one example.

As noted above, the image manipulation system may determine an image type of the input image in order to identify an existing cluster of encoder-decoder networks that may have provided better fitness scores for previously processed images of the same or similar image type and for the same operations that are to be performed on the input image. Accordingly, FIG. 6 shows an illustrative example of a process 600 for manipulating an image using an encoder-decoder network generated via generational cross-breeding of a population of encoder-decoder networks selected based on an image type in accordance with at least one example. The process 600 may be performed by the aforementioned image manipulation system, which may perform the evaluation of an input image to determine the corresponding image type.

Similar to the process 500 described above, the image manipulation system, at operation 602, may obtain an input image for manipulation using an encoder-decoder network. For instance, the image manipulation system may receive a request to de-noise one or more features of a provided image, to in-paint one or more regions of the image, or to upscale or otherwise improve the resolution (e.g., super-resolution) of an existing image in order to improve the quality of the image. The request may indicate an image type. For example, the request may indicate, as part of a file extension for the image (e.g., .jpg, .gif, .bmp, .tiff, .png, etc.), the type of image file provided to the image manipulation system. In some instances, the requestor may indicate the image type provided (e.g., three-dimensional graphic, graphite etching, oil painting, pen and ink drawing, watercolor painting, vector art, photograph, etc.).

In response to obtaining an image for manipulation, the image manipulation system, at operation 604, may evaluate the image to determine an image type. As noted above, a request to manipulate the image may indicate an image type. Thus, the image manipulation system may evaluate the request in order to identify the image type. Additionally, or alternatively, the image manipulation system may utilize one or more algorithms, such as machine learning algorithms, to evaluate the image and determine, based on the various properties of the image, an image type. For instance, the image manipulation system may compare the obtained image to images of varying types maintained by the image manipulation system to estimate a similarity in type to any of these other images.

Based on the identified image type for the obtained image, the image manipulation system, at operation 606, identifies an initial encoder-decoder network population for processing of the obtained image. In some examples, as noted above, the initial encoder-decoder network population can include a random selection of different encoder-decoder networks that may be used to generate an output image from a randomly selected noise map having the same dimensions as the input image. In some examples, using one or more machine learning techniques, such as a classification neural network (e.g., a classification CNN) pre-trained to classify image styles, the image manipulation system may identify different clusters of encoder-decoder networks that provide desired performance for particular image types. For instance, the classification neural network can identify the style of the input image and determine which networks with which to initialize the population. These clusters may each include unique populations of encoder-decoder networks discovered through past genetic crossover breeding for manipulating images of the same type as the input image using similar operations. From these clusters, the image manipulation system may identify a particular cluster of encoder-decoder networks corresponding to the image type as the initial population for processing of a noise map to generate an output image.

Using this initial encoder-decoder network population, the image manipulation system, at operation 608, may determine a fitness score for each encoder-decoder network of the population. This determination may be similar to that performed by the image manipulation system at operation 506 of the process 500 described above. For instance, using an operation specific reconstruction loss function, the image manipulation system may determine a reconstruction loss value for each encoder-decoder network. Further, the resulting reconstruction loss value for an encoder-decoder network may be used as a parameter in a perceptual measure or other fitness score function to determine the fitness score for the encoder-decoder network. The image manipulation system may calculate the fitness score for each encoder-decoder network based on the quality or "fitness" of the output image generated by each of the encoder-decoder networks compared to the input image.

The remaining operations of the process 600 may similar to those of the process 500 described above. For instance, at operation 610, the image manipulation system determines whether the resulting fitness scores for the population have converged. For the initial population, convergence may not be obtained, as there are no prior populations to compare the resulting maximum fitness score to. Thus, at operation 612, the image manipulation system may generate a new population based on the fitness scores of each of the encoder-decoder networks of the population, as described above. This may continue for several iterations until score convergence is achieved. Once score convergence has been achieved, the image manipulation system, at operation 614, may select an encoder-decoder network from the final population based on the fitness score of the encoder-decoder network (e.g., highest scoring encoder-decoder network, etc.). Further, at operation 616, the image manipulation system may use the selected encoder-decoder network to process the input image to generate an image output that may be provided to fulfill the request. As noted above, this final generation of encoder-decoder networks may be used to generate a new cluster for the particular image type. This may guide the image manipulation system in response to future requests to manipulate an input image of the same image type.

Figure 7:
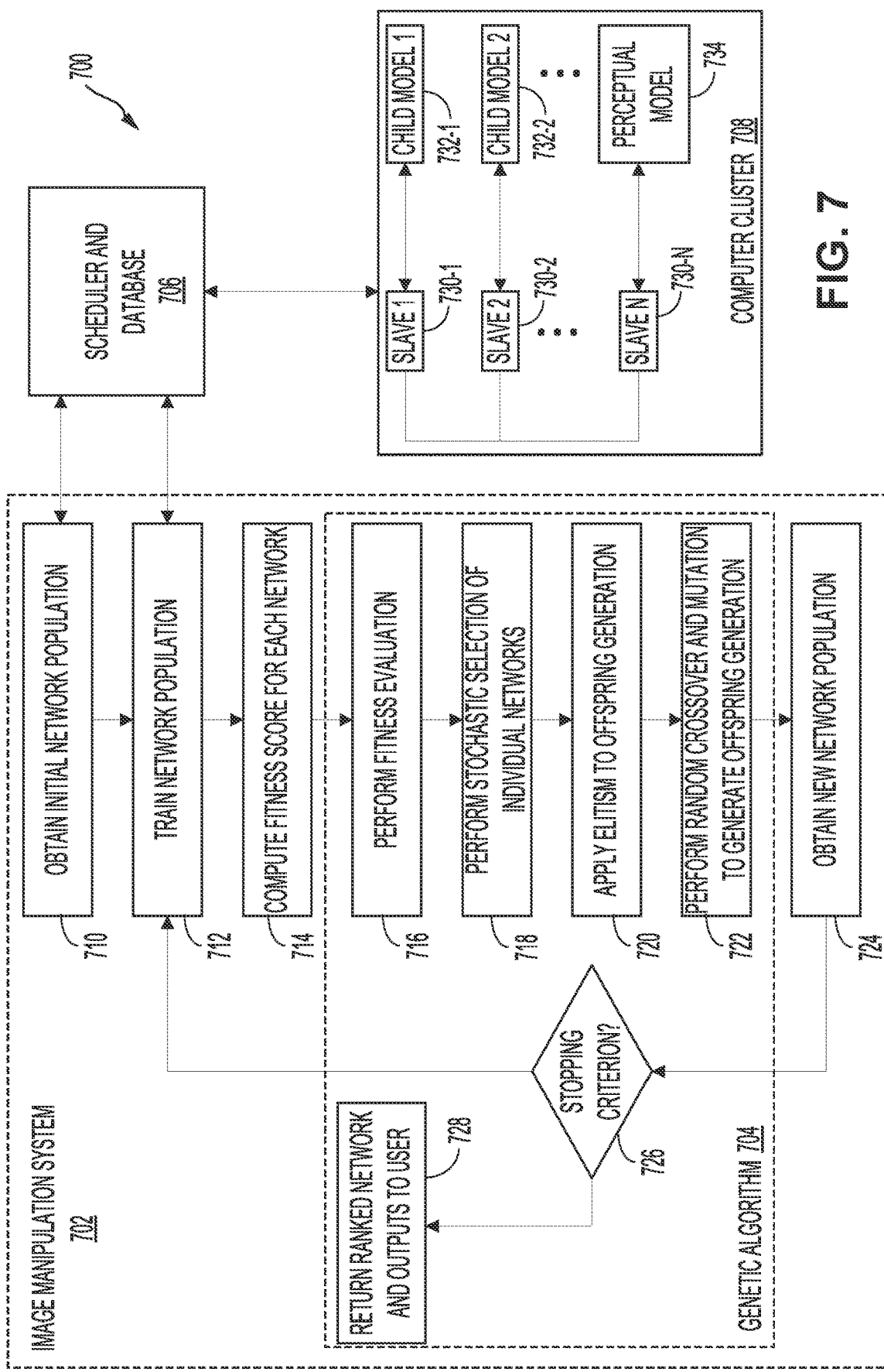
FIG. 7 shows an illustrative example of a flow diagram of an evolutionary neural network search for DIP networks in accordance with at least one example.

FIG. 7 shows an illustrative example of a flow diagram 700 of an evolutionary neural network search for DIP networks in accordance with at least one example. As illustrated in FIG. 7, an image manipulation system 702, at operation 710, obtains an initial network population of neural networks for manipulation of an image. The image manipulation system 702 may initialize the population with a set number of neural networks by sampling a pool of possible encoder-decoder combinations to seed the initial population of neural networks. This initial population of neural networks may be implemented, via a scheduler and database 706, on to one or more slave devices 730-1, 730-2 of a computer cluster 708. Each of the slave devices may implement and, at operation 712, train a unique neural network (shown as child model 1 732-1 and child model 2 732-2, where up to N−1 child models can be provided in the computer cluster 708) that may be used to process a noise map to obtain an output image. These output images may be passed to a particular slave device 730-N configured to implement a perceptual model 734 that may, at step 714, compute a fitness score for each of the neural networks of the initial network population. These fitness scores may be stored within the scheduler and database 706 where the fitness scores may be obtained by the image manipulation system 702.

In an example, the image manipulation system 702 utilizes a genetic algorithm 704 to generate a new population of neural networks for manipulation of an image. The genetic algorithm 704 can perform a heuristic process utilizing evolutionary principles, such as cross-breeding or crossover as described above, to identify a desired solution (e.g., a desired neural network) from a set of possible solutions (e.g., a set of neural networks). Using the genetic algorithm 704, the image manipulation system 702 performs, at operation 716, a fitness evaluation of the different neural networks of the initial network population. Further, at operation 718, the image manipulation system 702 performs a stochastic selection of individual networks for generating the new population of neural networks. For instance, the image manipulation system 702 may stochastically select, with replacement, a subset of neural networks based on the fitness scores of the neural networks of the initial population encoder-decoder networks. This may result in neural networks that produce higher quality output images (e.g., neural networks having better fitness scores) being more likely to be selected. In an example, the image manipulation system 702 is configured to promote population diversity for successive generations. Thus, the image manipulation system 702 may apply, at operation 720, elitism in its selection process for identifying the subset of neural networks for creating a successive generation population.

In an example, the genetic algorithm 704 performs, at operation 722, random genetic crossover and mutation among the selected neural networks of the initial population to obtain, at operation 724, a new neural network population. For instance, genetic algorithm 704 may stochastically select two individual neural networks with a bias towards fitness and utilize genetic cross-breeding via crossover and mutation to produce a novel offspring neural network for the new population. In an example, the genetic algorithm 704 introduces a mutation rate that may be used to introduce random mutations into the offspring genome. The mutation rate may be determined based on a desired convergence level for the resulting fitness score in successive generations, which may correlate to a higher quality output image for each operation.

In response to obtaining the new network population, the image manipulation system 702, at operation 726, determines if a stopping criterion has been satisfied. For instance, the image manipulation system 702 may determine that a maximum number of iterations for generating new network populations has been reached. Alternatively, the image manipulation system 702 may determine whether the fitness scores for the population has converged on a value that satisfies a fitness score threshold, as described above. If a stopping criterion has been satisfied, the image manipulation system 702 may return, at operation 728, a ranked network (e.g., neural network having the best fitness score within the population) and the image outputs to the user (e.g., requestor). However, if a stopping criterion has not been satisfied, the image manipulation system 702 may initiate a new iteration by training, at operation 712, this new network population.

Figure 8:
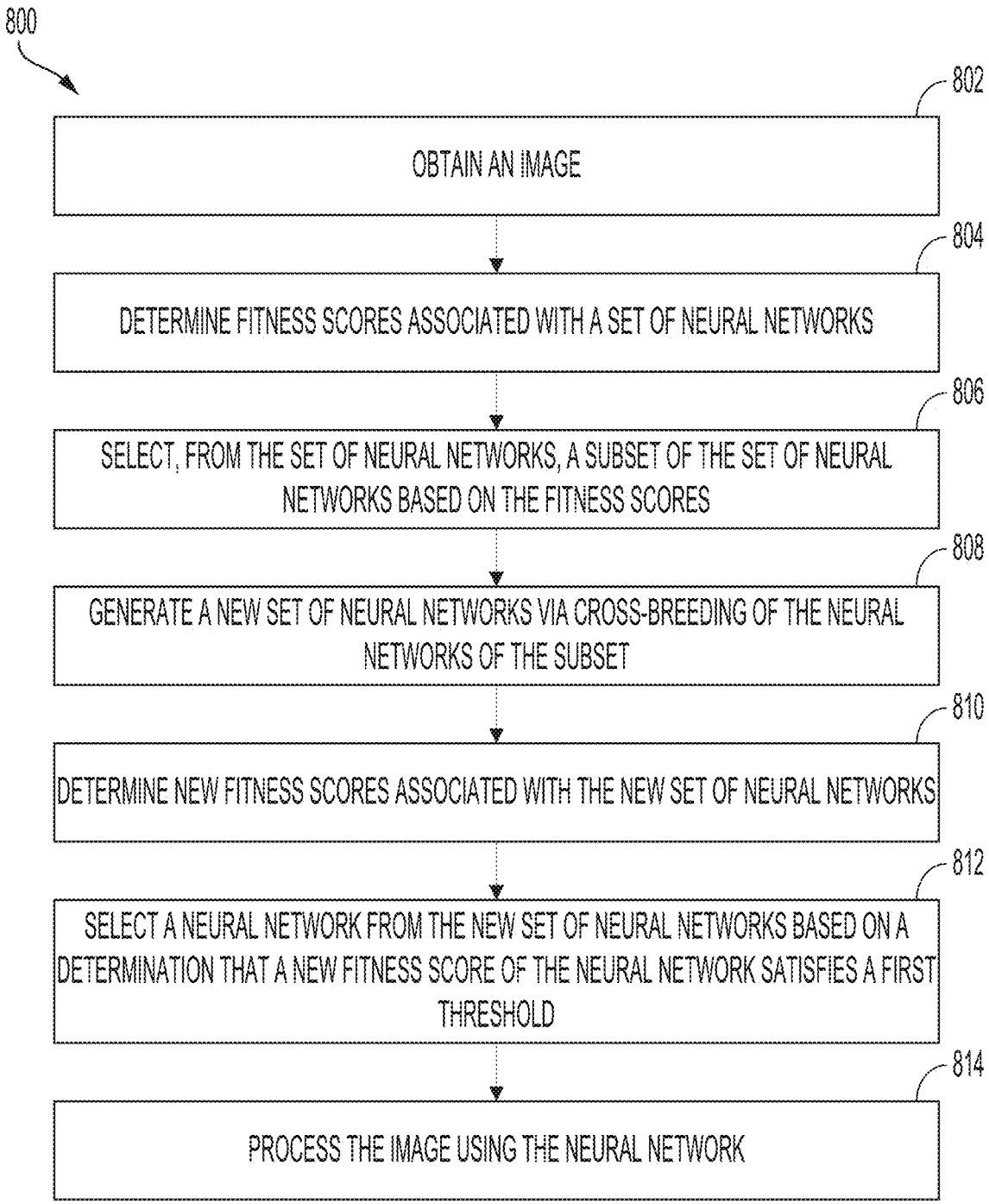
FIG. 8 shows an illustrative example of a process for processing an image using a neural network selected from a population of neural networks based on fitness scores of the population of neural networks in accordance with various examples.

FIG. 8 shows an illustrative example of a process 800 for processing an image using a neural network selected from a population of neural networks based on fitness scores of the population of neural networks in accordance with various examples. At operation 802, the process 800 includes obtaining an image. The image can be obtained along with a request to perform a task on the image. For instance, a request can be received requesting the image manipulation system to perform a task to restore one or more features of the image (e.g., to perform de-noising, in-painting, and/or super-resolution tasks or operations on the image). The request can be received as user input via a user input interface (e.g., a touch-sensitive screen, keyboard, mouse, motion input interface, a speech input such as a microphone, and/or other input). The image can be processed by a selected neural network to restore the one or more features of the image.

At operation 804, the process 800 includes determining fitness scores associated with a set of neural networks. For this set of neural networks, at least one fitness score for at least one neural network of the set of neural networks is determined based on a processing of a noise map by at least one neural network of the set of neural networks. For instance, each neural network of the set of neural networks can process the noise map (or different noise maps in some cases). A fitness score can be determined for a neural network of the set of neural networks based on the neural network processing the noise map, as described above. In an example, the set of neural networks are selected based on an image type of the obtained image. For instance, in response to obtaining the image, the image is evaluated to determine an image type. The fitness scores of the set of neural networks can be determined using a loss function. The loss function can be selected from a group of available loss function based on a type of processing (e.g., a task associated with the image) that can be performed on the image to restore the one or more features of the image. As indicated above, the task can be indicated in a request to process the image (e.g., a request to perform a task to restore one or more features of the image).

The set of neural networks can include symmetric and asymmetric encoder-decoder networks. In some examples, each neural network includes a set of encoder-decoder units. Each encoder-decoder unit of the set of encoder-decoder units can include one or more encoder convolutional stages and one or more decoder convolutional stages. In some cases, each encoder-decoder unit of the set of encoder-decoder units can further include one or more skip connections from the encoder convolutional stages to the decoder convolutional stages.

At operation 806, the process 800 includes selecting, from the set of neural networks, a subset of the set of neural networks based on the fitness scores. In an example, neural networks of the set of neural networks having a fitness score lower than a threshold value (different from the first and second thresholds described below) are removed. Further, at operation 808, the process 800 includes generating a new set of neural networks by cross-breeding of the neural networks of the subset of the set of neural networks. In an example, generating the new set of neural networks includes selecting a mutation rate for cross-breeding each neural network from the subset of the set of neural networks. The mutation rate defines a probability of changing one or more bits during the cross-breeding of each neural network from the subset of the set of neural networks. The mutation rate is applied to the subset of the set of neural networks to generate the new set of neural networks.

At operation 810, the process 800 includes determining new fitness scores associated with the new set of neural networks. At operation 812, the process 800 includes selecting a neural network from the new set of neural networks based on a determination that a new fitness score of the neural network satisfies a first threshold. The selection of the neural network can performed as a result of the new fitness scores of the new set of neural networks satisfying a second threshold. For example, once the fitness scores of the new set of neural networks reach a certain fitness score defined by the second threshold, the neural network having a highest fitness score can be selected at operation 812. In some cases, the first threshold satisfied by the neural network may include a fitness score. In an example, the neural network satisfies the first threshold as a result of the new fitness score of the neural network being lower than the fitness score that defines the first threshold.

At operation 814, the process 800 includes processing the image using the neural network that satisfies the first threshold. In some cases, processing the image can include using the neural network selected from the new set of neural networks to restore one or more features of the image. The processed image (the image after being processed by the neural network) can be output for display, storage, or for another purpose. For instance, the image can be output (e.g., for display, storage, etc.) by a device to fulfill the request to perform the task on the image.

Figure 9:
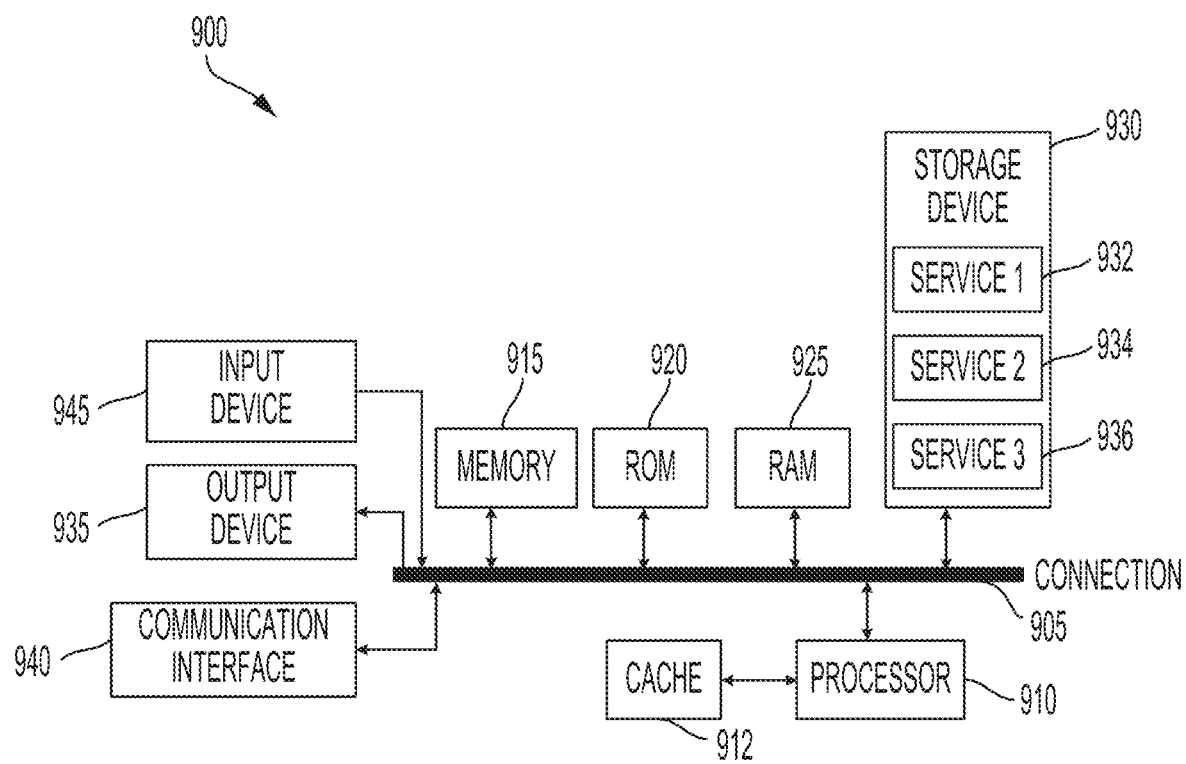
FIG. 9 is an example computing device architecture of an example computing device that can implement the various techniques described herein.

In some examples, the processes described herein (e.g., process 500, process 600, process 800, or other process described herein) may be performed by a computing device or apparatus, such as a computing device having the computing device architecture 900 shown in FIG. 9. For example, the processes 500, 600, and/or 800 can be performed by a computing device with the computing device architecture 900 implementing the image manipulation system. The computing device can include any suitable device, such as a mobile device (e.g., a mobile phone), a desktop computing device, a tablet computing device, a wearable device, a server (e.g., in a software as a service (SaaS) system or other server-based system), and/or any other computing device with the resource capabilities to perform the processes described herein, including processes 500, 600, and/or 800. In some cases, the computing device or apparatus may include various components, such as one or more input devices, one or more output devices, one or more processors, one or more microprocessors, one or more microcomputers, and/or other component that is configured to carry out the operations of processes described herein. In some examples, the computing device may include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 500, 600, and/or 800 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

The processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 9 illustrates an example computing device architecture 900 of an example computing device which can implement the various techniques described herein. For example, the computing device architecture 900 can implement one or more of the image manipulation system 102 (of FIG. 1), the image manipulation system 302 (of FIG. 3), and/or the image manipulation system 402 (of FIG. 4). The components of computing device architecture 900 are shown in electrical communication with each other using connection 905, such as a bus. The example computing device architecture 900 includes a processing unit (CPU or processor) 910 and computing device connection 905 that couples various computing device components including computing device memory 915, such as read only memory (ROM) 920 and random access memory (RAM) 925, to processor 910.

Computing device architecture 900 can include a cache of high-speed memory connected directly with, in close proximity to, or integrated as part of processor 910. Computing device architecture 900 can copy data from memory 915 and/or the storage device 930 to cache 912 for quick access by processor 910. In this way, the cache can provide a performance boost that avoids processor 910 delays while waiting for data. These and other modules can control or be configured to control processor 910 to perform various actions. Other computing device memory 915 may be available for use as well. Memory 915 can include multiple different types of memory with different performance characteristics. Processor 910 can include any general purpose processor and a hardware or software service, such as service 1 932, service 2 934, and service 3 936 stored in storage device 930, configured to control processor 910 as well as a special-purpose processor where software instructions are incorporated into the processor design. Processor 910 may be a self-contained system, containing multiple cores or processors, a bus, memory controller, cache, etc. A multi-core processor may be symmetric or asymmetric.

To enable user interaction with the computing device architecture 900, input device 945 can represent any number of input interface or mechanisms, such as a microphone for speech, a touch-sensitive screen for gesture or graphical input, keyboard, mouse, motion input, speech and so forth. Output device 935 can also be one or more of a number of output mechanisms known to those of skill in the art, such as a display, projector, television, speaker device, etc. In some instances, multimodal computing devices can enable a user to provide multiple types of input to communicate with computing device architecture 900. Communication interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. Storage device 930 can include services 932, 934, 936 for controlling processor 910. Other hardware or software modules are contemplated. Storage device 930 can be connected to the computing device connection 905. In one aspect, a hardware module that performs a particular function can include the software component stored in a computer-readable medium in connection with the necessary hardware components, such as processor 910, connection 905, output device 935, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, operations or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm operations described in connection with the embodiments disclosed herein may be implemented as electronic hardware, computer software, firmware, or combinations thereof. To clearly illustrate this interchangeability of hardware and software, various illustrative components, blocks, modules, circuits, and operations have been described above generally in terms of their functionality Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method of processing images, comprising:
   obtaining an image;
   selecting a set of neural networks based on an image type of the image;
   determining fitness scores associated with the set of neural networks, wherein the set of neural networks includes a symmetric encoder-decoder network and an asymmetric encoder-decoder network, and wherein at least one fitness score is determined based on a processing of a noise map by at least one neural network of the set of neural networks;
   selecting, from the set of neural networks, a subset of the set of neural networks based on the fitness scores of the set of neural networks;
   generating a new set of neural networks, wherein the new set of neural networks are generated via cross-breeding of the selected subset of the set of neural networks;
   determining new fitness scores associated with the new set of neural networks;
   selecting a neural network from the new set of neural networks based on a determination that a new fitness score of the neural network satisfies a first threshold; and
   processing the image using the neural network.

2. The method of claim 1, wherein the neural network is selected based on the new fitness scores associated with the new set of neural networks satisfying a second threshold.

3. The method of claim 1, wherein processing the image using the neural network includes using the neural network selected from the new set of neural networks to restore one or more features of the image.

4. The method of claim 1, further comprising:
   determining, using a classifying neural network, the image type of the image.

5. The method of claim 1, further comprising:
   selecting a mutation rate for cross-breeding the subset of the set of neural networks, wherein the mutation rate defines a probability of changing one or more bits during the cross-breeding of the subset of the set of neural networks; and
   applying the mutation rate to the subset of the set of neural networks to generate the new set of neural networks.

6. The method of claim 1, further comprising:
   selecting a reconstruction loss function based on a type of task associated with the image; and
   determining the fitness scores associated with the set of neural networks using the selected reconstruction loss function.

7. The method of claim 1, wherein the first threshold is a first fitness score, and further comprising:
   determining the new fitness score of the neural network satisfies the first threshold based on the new fitness score being lower than the first fitness score.

8. A system for generating one or more answers for one or more queries, comprising:
   one or more processors; and
   memory accessible to the one or more processors, the memory storing instructions, which upon execution by the one or more processors, cause the one or more processors to:
   obtain an image;
   select a set of neural networks based on an image type of the image;
   determine fitness scores associated with the set of neural networks, wherein the set of neural networks includes a symmetric encoder-decoder network and an asymmetric encoder-decoder network, and wherein at least one fitness score is determined based on processing of a noise map by at least one neural network of the set of neural networks;
   identify a subset of the set of neural networks based on the fitness scores;
   generate, using a genetic algorithm configured to perform cross-breeding on the identified subset of the set of neural networks, a new set of neural networks; and
   select a neural network from the new set of neural networks based on a determination that a new fitness score of the neural network satisfies a threshold for use in processing the image.

9. The system of claim 8, the memory storing instructions, which upon execution by the one or more processors, cause the one or more processors to:
- obtain a request to perform a task on the image;
- select a loss function based on the task; and
- determine the fitness scores associated with the set of neural networks using the selected loss function.

10. The system of claim 8, wherein the neural network includes a set of encoder-decoder units, wherein each encoder-decoder unit of the set of encoder-decoder units includes one or more encoder convolutional stages and one or more decoder convolutional stages, and wherein each encoder-decoder unit of the set of encoder-decoder units is encoded using a bit string.

11. The system of claim 10, wherein each encoder-decoder unit of the set of encoder-decoder units further includes one or more skip connections from the one or more encoder convolutional stages to the one or more decoder convolutional stages.

12. The system of claim 10, the memory storing instructions, which upon execution by the one or more processors, cause the one or more processors to:
- apply a mutation rate to the subset of the set of neural networks, the mutation rate defining a probability of changing one or more bits of the bit string during the cross-breeding of the subset of the set of neural networks.

13. The system of claim 8, the memory storing instructions, which upon execution by the one or more processors, cause the one or more processors to:
- remove each neural network of the set of neural networks having a fitness score lower than a threshold value.

14. The system of claim 8, the memory storing instructions, which upon execution by the one or more processors, cause the one or more processors to:
- determine, using a classifying neural network, the image type of the image.

15. A non-transitory computer-readable storage medium having stored thereon instructions that, when executed by one or more processors, cause the one or more processors to:
- obtain a first image;
- select a set of neural networks based on an image type of the first image;
- determine fitness scores of the set of neural networks, wherein at least one fitness score is determined based on processing of a noise map by at least one neural network of the set of neural networks;
- determine, in response to obtaining the first image, fitness scores associated with the set of neural networks, wherein the set of neural networks includes a symmetric encoder-decoder network and an asymmetric encoder-decoder network, and wherein at least one fitness score is determined based on processing of a noise map by at least one neural network of the set of neural networks;
- identify, from the set of neural networks and based on the fitness scores of the set of neural networks, a subset of the set of neural networks that satisfy a first threshold;
- utilize a machine learning technique on the subset of the set of neural networks to obtain a new set of neural networks;
- determine new fitness scores of the new set of neural networks;
- identify a neural network from the new set of neural networks, wherein the neural network has a new fitness score that satisfies a second threshold; and
- process, using the neural network, a second image having the image type of the first image.

16. The non-transitory computer-readable storage medium of claim 15, wherein the instructions further cause the one or more processors to:
- determine, using a classifying neural network, the image type of the first image.

17. The non-transitory computer-readable storage medium of claim 15, wherein the instructions further cause the one or more processors to:
- apply a mutation rate to the subset of the set of neural networks, wherein the neural network includes a set of encoder-decoder units, wherein each encoder-decoder unit of the set of encoder-decoder units is encoded using a bit string, the mutation rate defining a probability of changing one or more bits of the bit string during a cross-breeding of the subset of the set of neural networks.

18. The non-transitory computer-readable storage medium of claim 15, wherein the neural network includes a set of encoder-decoder pairings.

19. The non-transitory computer-readable storage medium of claim 15, wherein the instructions further cause the one or more processors to:
- obtain a request to perform a task on the first image;
- select a loss function specific to the task; and
- use the loss function specific to the task to determine the fitness scores of the set of neural networks.

* * * * *